H. CASLER.
FOUNTAIN MOP.
APPLICATION FILED JAN. 9, 1913.
1,193,761.  Patented Aug. 8, 1916.
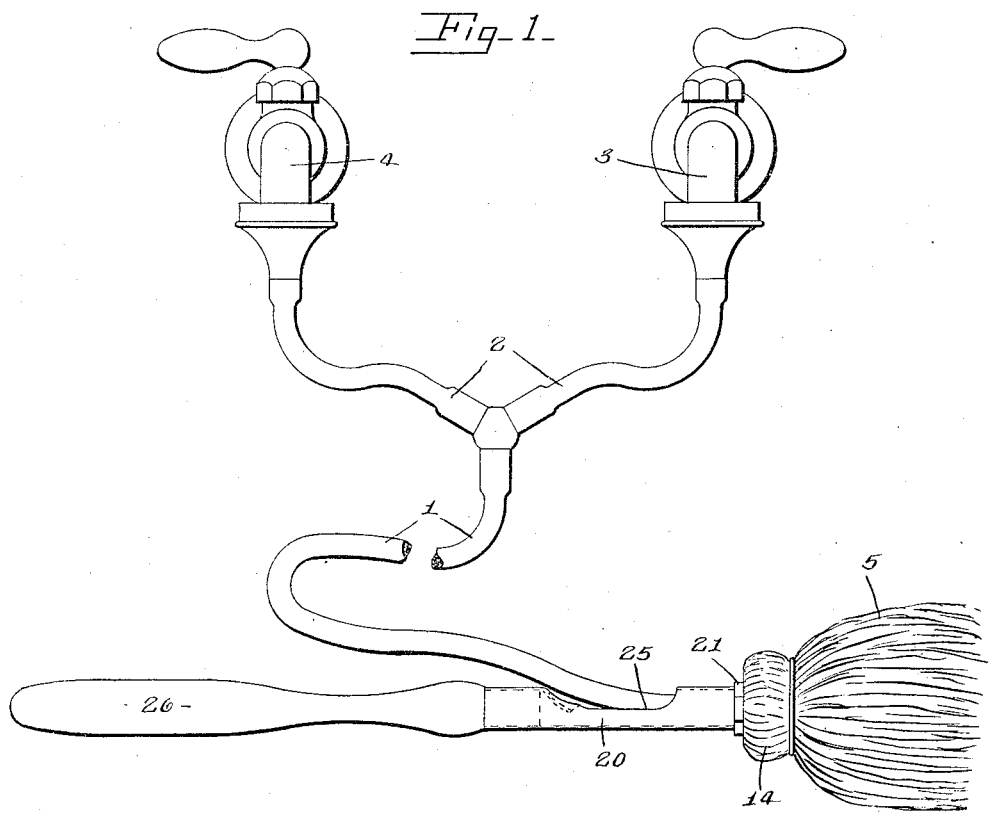
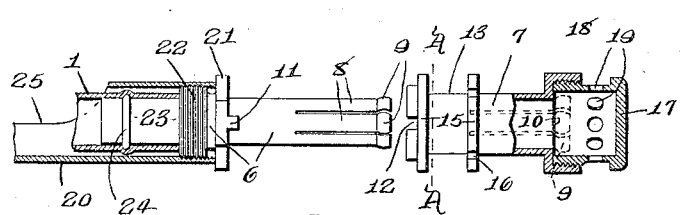

UNITED STATES PATENT OFFICE.

HERMAN CASLER, OF CANASTOTA, NEW YORK, ASSIGNOR TO ISABEL L. LEWIS, OF SYRACUSE, NEW YORK.

FOUNTAIN-MOP.

1,193,761.  Specification of Letters Patent.  Patented Aug. 8, 1916.

Application filed January 9, 1913. Serial No. 740,984.

*To all whom it may concern:*

Be it known that I, HERMAN CASLER, of Canastota, in the county of Madison and State of New York, have invented a certain new and useful Fountain-Mop, of which the following is a specification.

This invention has for its object the production of a fountain mop, particularly applicable for washing dishes and the like, which is particularly simple and economical in construction, and highly efficient and durable in use, and the invention consists in the combinations and constructions hereinafter set forth and claimed.

In describing this invention reference is had to the accompanying drawings in which like characters designate corresponding parts in all the views.

Figure 1 is an elevation of my fountain mop, the same being shown as connected to hot and cold water faucets. Fig. 2 is a detail view partly in section of the means for coupling the mop, the hose, and the handle, the members of the coupling being shown as detached. Fig. 3 is a sectional view on line "A—A," Fig. 2.

This fountain mop comprises, generally, a hose for connection with a faucet, a mop, a handle, and means for coupling the mop to the hose, and to the handle.

1 designates the hose which is here shown as formed with branches 2 for connection with hot and cold water faucets 3 and 4.

5 is the mop.

The coupling for connecting the mop and the hose includes two tubular members or sections 6, 7, the member 6 having means for connection with the hose and with the handle, and the member 7 being detachable from the member 6 and carrying the mop.

The members 6 and 7, are here shown, as having interengaging means which are impositively or frictionally interlocked in the normal use of the instrument and which can readily be detached for permitting one mop and its corresponding section or member to be detached and another mop with its member to be attached.

In the illustrated form of my invention, the coupling members 6 and 7 are shown as formed with telescoping portions, the inner portion being expansible and contractile and of sufficient diameter to engage the internal face of the outer portion and hold the parts from detachment in the normal use of the instrument.

As here shown, the member or section 6 which is coupled to the hose and the handle, is formed with the inner telescoping portion, which is shown as provided with a plurality of lengthwise slits which form spring prongs 8, and the prongs are formed with rounding enlargements 9 at their ends which snap into engagement with an internal shoulder 10 within the detachable member 7 and thus impositively lock the members or sections 6, 7 together, as illustrated in dotted lines, Fig. 2.

The members 6, 7 are also formed with means for preventing relative turning movement of the members when they are in operative position, said means being here shown as consisting of teeth, as the tooth 11 provided on the section 6 and arranged to enter notches as the notch 12 at the inner end of the section 7, when the sections 6, 7 are telescoped together and the shoulders 9 are interlocked with the shoulder 10. The member 7 is also provided with a peripheral groove 13 near its inner end for receiving the base 14 of the mop, this groove 13 being formed by a pair of peripheral flanges 15 spaced apart, one of which is formed with a plurality of oppositely directed teeth 16, Fig. 3, for taking into the base of the mop and preventing the mop from turning on the member 7.

The member 7 includes a detachable spray head 17 at its inner end, this head being located within the mop, and as here shown, the body of the member 7 is formed with an enlargement or bell 18 at its inner end, the peripheral wall of this enlargement being internally threaded, and the spray head threads into the enlargement and abuts against the bottom thereof. A portion of the bottom of the enlargement also forms the shoulder 10 previously referred to. The spray head is usually closed at its end and is formed with a series of circumferential jet openings 19.

20 is a tube coupled to the member 6 and encircling the body of said member 6. The member 6 is here shown as provided with a peripheral shoulder 21, and a threaded enlargement or collar 22 located between the ends of the member 6 and at the base of the telescoping portion of the member 6, and the tube threads on said collar 22 and abuts at one end against the shoulder 21.

The body of the coupling member 6 within the tube 20 is also formed with a portion 23 of less diameter than the tube and spaced apart from the inner circumferential wall thereof. The portion 23 constitutes a nipple for connection to the hose, the end of which fits over the nipple 23 and is held from detachment by an annular enlargement or shoulder 24 on said nipple 23, the inner end of the hose abutting against the threaded collar 22. The tube 20 is also formed with an opening 25 in one side thereof for permitting the hose to be connected to the member 6.

26 is the handle inserted in the outer end of the tube 20.

In use, each mop 5 is provided with one section 7 and in use, the branches 2 are connected to the faucets, and one mop can be used for washing one kind of articles as ordinary dishes and another mop used for particularly unclean dishes or for kettles, etc., as by reason of the construction of the coupling members 6, 7, one mop can be readily removed and another attached without requiring much handling of the mops.

What I claim is:

1. Means for coupling a hose and a mop comprising a tubular member including a body upon which the mop is mounted, said member having an enlarged spray head at one end formed with an internal shoulder, and a member including a tube extending into the former member and being expansible and contractile and having projections for engaging said shoulder, substantially as and for the purpose set forth.

2. Means for coupling a hose and a mop comprising two tubular members, one having a portion telescoping within the other, the telescoping members having expansible and contractile means for holding said members together, substantially as and for the purpose described.

In testimony whereof, I have hereunto signed my name in the presence of two attesting witnesses, at Canastota, in the county of Madison, in the State of New York, this 23d day of December 1912.

HERMAN CASLER.

Witnesses:
 HAZEL WAUGH,
 E. D. NEWKIRK.

Copies of this patent may be obtained for five cents each, by addressing the "Commissioner of Patents, Washington, D. C."